United States Patent
Chao et al.

(10) Patent No.: US 6,700,652 B2
(45) Date of Patent: Mar. 2, 2004

(54) LOW-COST CONTINUOUS-WAVE-LASER (CW LASER) DIGITAL PARTICLE IMAGE VELOCIMETRY

(75) Inventors: Yei-Chin Chao, Tainan (TW); Chih-Yung Wu, Tainan (TW); Yung-Li Chang, Tainan (TW)

(73) Assignee: National Science Council, Taipei (TW)

( * ) Notice: Subject to any disclaimer, the term of this patent is extended or adjusted under 35 U.S.C. 154(b) by 71 days.

(21) Appl. No.: 09/908,773

(22) Filed: Jul. 20, 2001

(65) Prior Publication Data

US 2002/0145726 A1 Oct. 10, 2002

(30) Foreign Application Priority Data

Mar. 5, 2001 (TW) .......................................... 90105213 A

(51) Int. Cl.[7] .............................. G01P 3/36; G01F 1/00
(52) U.S. Cl. ............................................ 356/28; 73/861
(58) Field of Search ................................ 356/28; 73/861

(56) References Cited

U.S. PATENT DOCUMENTS

| | | | | | |
|---|---|---|---|---|---|
| 4,201,467 A | * | 5/1980 | Hartmann et al. | ............. | 356/28 |
| 4,804,263 A | * | 2/1989 | Schodl | .......... | 356/28 |
| 4,919,536 A | * | 4/1990 | Komine | ........... | 356/28 |
| 4,989,969 A | * | 2/1991 | Siebert et al. | ................. | 356/28 |
| 5,491,642 A | * | 2/1996 | Wormell et al. | ............... | 356/28 |
| 5,751,410 A | * | 5/1998 | Roehle et al. | ................ | 356/28 |
| 5,883,707 A | * | 3/1999 | Arndt et al. | .................. | 356/28 |

FOREIGN PATENT DOCUMENTS

| DE | 19737933 | * | 3/1998 |
|---|---|---|---|
| WO | 0148489 | * | 7/2001 |

OTHER PUBLICATIONS

M.E. Post et al, Experiments in Fluids 16, 263–272, (1994).*
Y.M. Gbamele et al, Transactions of the ASME, vol. 122, Jun. 2000, p. 438.*
Simpkins, P.G., et al., "Laser Speckle Measurements of Transient Bénard Convection", *J. Fluid Mech.*, vol. 89, part 4, pp. 665–671, 1980.
Meynart, R., "Equal Velocity Fringes in a Rayleigh–Benard Flow by a Speckle Method", *Applied Optics*, vol. 19, No. 9, May 1, 1980.
He, Z. H., et al., "Two–Dimensional Fluid–Velocity Measurements by Use of Digital–speckle Correlation Techniques", *Experimental Mechanics*, pp. 117–121,Jun. 1984.
Sheng–Yuh Jaw, et al., "Alternating Color Image Anemometry," Taiwan, R. O.C.

* cited by examiner

*Primary Examiner*—Stephen C. Buczinski
(74) *Attorney, Agent, or Firm*—Robert E. Bushnell, Esq.

(57) ABSTRACT

The invention of a Low-Cost alternating color-pulse digital particle-image velocimetry DPIV (Digital Particle Image Velocimetry) system is proposed. In the proposed system Low-Cost basic equipments are used such as a continuous-wave laser in mixed mode, a CCD (Charge Couple Device) camera, a PMT (Photo-Multiplier Tube), an image-processing card, a PC (personal computer) etc., with an add-on alternating-color planar laser-sheet generating facility to achieve the purpose of DPIV (Digital Particle Image Velocimetry) of planar velocity measurements. With the add-on facility, the laser beam from the continuous-wave laser operated in mixed mode is turned into a planar laser sheet with alternating color at a designated frequency. The CCD (Charge Couple Device) camera captures the alternating-color images of the flow field seeded with small particles. The images are then sent to a personal computer for analysis of the magnitude and direction of the velocity distribution of the flow field using cross-correlation method.

17 Claims, 5 Drawing Sheets

LOW-COST CONTINUOUS-WAVE-LASER (CW LASER) DIGITAL PARTICLE IMAGE VELOCIMETRY

1. Field of the Invention

This invention discloses a low-cost continuous wave laser DPIV (Digital Particle Image Velocimetry). The photographs of a particle-seeded flow field, illuminated by a laser sheet, taken by the CCD (Charge Couple Device) camera with different time intervals between exposures and then processed by a computer, can be used to detect particles' locations, displacements and their moving loci in the flow field, and accordingly determine the particles' velocities and the 2-D (two-dimensional) spatial distribution of instantaneous velocity in the flow field.

2. Background of the Invention

In early studies of fluid mechanics, such an intrusive measurer as Hot Wire Anemometer or Pitot Tube was used in a flow field to measure velocity data at a specific point, and Flow Visualization Techniques to observe the qualitative data like geometric distributions of streamlines, shapes of flow fields, etc., and thus to learn the properties of the flow fields.

With the new and flourishing development in Optics, Electronics, Image processing, Laser technology, and digital computers, LDV (Laser Doppler Velocimetry) has been widely applied in measuring the single-point velocity in a flow field. Such "non-intrusive measurement" will both maintain the integrity of a flow field and meanwhile improve the accuracy of the velocity and Turbulence measurement. However, Single-point Measurement Technique can only obtain data at only one single point without immediate and complete velocity distribution information of an entire plane. Thanks to the efforts of forerunners, in late 70's, PSV (Particle Streak Velocimetry) was first reported by Simpkins, P.G. et al. (J. of Fluid Mech. Vol.89, pp.665–671, 1978). A transitory Mie scattering photo of a flow field seeded with micro particles was taken by a CCD (Charge Couple Device), via scanning of laser or other resources of illumination, to analyze (either with the film or the picture) the moving loci of particles in the flow field, and accordingly to make clear the velocity magnitude and direction of particles in a 2-D plane and the spatial distributions of the velocity in the flow field. Equipment for such a velocity measuring method via loci was simple to manipulate, and velocity of particles could be easily figured out through manual analyses. But to complicated images of more and speedy particles, it failed to process and thus determine the exact velocity direction of a flow field.

3. Description of the Prior Art

Once the encoded flashes of different time lapses were used to determine the velocity directions: a single particle might leave line segments of different lengths in the image, and the velocity directions could thus be determined by comparing the segment length and its corresponding code. Similarly, this method was still of little use in processing complicated flow-field images. Late in 80's, two methods were applied: Young's Fringe Method reported by Meynart, R. (Applied Optics. Vol.19, #9, pp.1385–1386, 1983) and Auto-correlation Method by He, Z. H. et al. (Experimental Mechanics, pp.117–121, 1984). Since the operations of the former method were too sophisticated, a 2-D auto-correlation analysis was usually adopted instead. Nonetheless, these two methods still had trouble in determining the moving directions of particles, although they were helpful in rather complex images.

A digital particle image velocimetry was thus invented to solve the above-said troubles. Equipment used in this DPIV (Digital Particle Image Velocimetry) method included Pulse Laser, CCD (Charge Couple Device) Camera, Frame Grab, computer, and so on. An image of a flow field illuminated by a high-energy pulse laser was taken by a CCD (Charge Couple Device), and then interfaced to a computer for image processing through a Frame Grabber. For determination of velocity, a Single-Image auto-correlation Analysis can be adopted; for velocity directions, two methods were available: either by exactly controlling the relative time delay of the Double Pulse laser flashes vs. actuations of the camera to determine the sequence of two images and then processing these two images with cross-correlation analysis method, or by using two laser pulses, with one of which delayed and passing through a Raman Tube to change its color, to take two images of different colors, and then using the cross-correlation analysis method to determine the velocity and its direction. It was believed that better measurements could be obtained by such methods, but the outstanding high costs of the Double Pulse high-energy laser, Raman Tube for changing colors, complex delay controller, and high-speed Frame Grabber were not affordable for average research institutes and individuals.

Recently, due to the rapid development of digital color image techniques, different colors of an image could be easily separated. The processing of color separation in an image for cross-correlation analysis is shown in FIG. 1. During the period when the shutter of the CCD camera was activated, a green laser beam from the color alternating device (describe later) first illuminated the particles of a flow field, making the particles scattering green beam-marked as the first time point; then a blue laser beam took turns and thus the second time point marked. As illuminated by the alternative green and blue beams, the same particle appeared in different colors at different positions while moving. The entire period from the beginning of green beam illumination to the end of blue beam illumination was completed during a shutter period. In such a way, a digital color photo (101) was obtained. In order to obtain the velocity distribution, the color photo was divided into small cells called an interrogation window (107), in which black solid marks stood for green beam images (102) and hollow ones for blue beam images (103). Green and blue images could be separated since this kind of digital color photos (101) were comprised of three primary colors, i.e. red, blue and green, and thus could usually be separated by a computer installed with related programs. The purpose of the above-said image color separation (104) was to determine by the mathematic cross-correlation analysis (105) whether two points were left by the same particle respectively at different times and positions in the green and blue images. When the distance between the two points was calculated, then divided by the time time gap between green and blue pulses, one could easily obtain the moving velocity of the particle (106). And just by comparing different color signals in the same image, the direction component of the particulate velocity could be also found. The Color alternating Image Velocity Measurement reported by Jaw, S. -Y. et al. (The $22^{nd}$ Symposium on Naval Hydrodynamics, Washington D.C., U.S.A., 1998) was developed from the above method, in which a combined beam, produced by an Argon ion laser, could be transformed into a planar laser sheet of two alternating colors by alternatively changing the laser wavelength via an AOM (Acousto-Opto Modulator). Therefore, the images, taken by a CCD (Charge Couple Device) while a flow field was scanned by the alternating dual colors, could be used to determine the direction and size of the flow field and thus determine the 2-D velocity measurement by distinguishing different images taken at different times. The continuous Argon ion laser (1) was inexpensive though it had limitations in range and accuracy of measuring particle velocity. And the combined beam, used in the Alternating Dual Color Image Velocity Measurement, was produced by an Argon ion laser (1), which was a Low-Cost piece of equipment. However, the wavelength of the laser beam had to be transformed through particular AO modulation techniques, and the special AOM (Acousto-Opto Modulator) was difficult in manipulation, controlling and in data acquisition.

The inventor of the Low-Cost Continuous Laser DPIV (Digital Particle Image Velocimetry) has been engaged in observing and measuring flow fields for years and had personally performed all the above said methods. It is assured that the Color Alternating Image applied in image velocity measurement can determine the velocity and direction of particles in a flow field rather accurately and effectively. And even more, velocimitry may also be applied in biological and micro-mechanical technologies in measuring the transmitting speed of particles, non-intrusively. To get rid of the above-said manipulating, controlling and acquiring difficulties, the inventor discarded the particular AO modulation techniques to transform combined beams into color alternating beams. Instead, disclosed is A Low-Cost Continuous-Wave-Laser (CW Laser) Digital Particle Image Velocimetry and equipment conceived by the inventor.

SUMMARY OF THE INVENTION

It is therefore an object of the present invention to provide an inexpensive yet effective method and apparatus for determining particulate velocity in a particle flow field.

It is also an object of the present invention to effectively measure particle velocity in a flow field without using AOM and without disturbing the particle flow field when making the measurements.

It is further an object of the present invention to produce a single laser sheet beam alternating between green and blue light using inexpensive equipment, said sheet beam capable of being used to illuminate a particle flow field to determine particulate velocity using cross-correlation analysis.

These and other object can be achieved by the the Low-Cost Continuous Laser DPIV (Digital Particle Image Velocimetry) device, which can transform combined beams into color alternating laser sheets via certain color-alternating equipment to diagnose particle velocity in flow fields. And the color-alternating images taken by the CCD (Charge Couple Device) can be analyzed by a computer, and with the help of the cross-correlation analysis method, to determine the two-dimensional distribution of the magnitude and direction of the flow velocities of particles in a flow field without using AOM.

The Low-Cost Continuous-Wave-Laser (CW Laser) Digital Particle Image Velocimetry can determine the velocity and the direction of a particle in a flow field, the particles' moving locus, the velocity in a 2-D plane and the velocity distribution in a space via computer processed images taken by the CCD (Charge Couple Device) in particle flow fields.

In the formation of the color alternating laser sheet, two continuous wave monochromatic beams, each of different wavelengths, impinge on a rotating wheel perforated by holes to produce two monochromatic pulsating beams that pulsate in an alternate manner. Then, these two pulsating beams of different color are combined into a single beam to illuminate the particle flow field. This wheel or chopper is rotated at a speed that dictates the length of each pulse and the frequency in which the color alternates in the resulting laser sheet. This information is coupled with a camera that takes exposures, the camera being triggered by the light pulses. The time gap between consecutive images of the particle flow field is found from the speed of the chopper motor. By noting the displacement of a particle in the flow field between the two consecutive images, particle velocity can then be determined.

While the invention is susceptible to various modification and alternative forms, certain illustrative embodiments thereof have been shown by way of example in the drawing and will herein be described in detail.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

Figure 1:
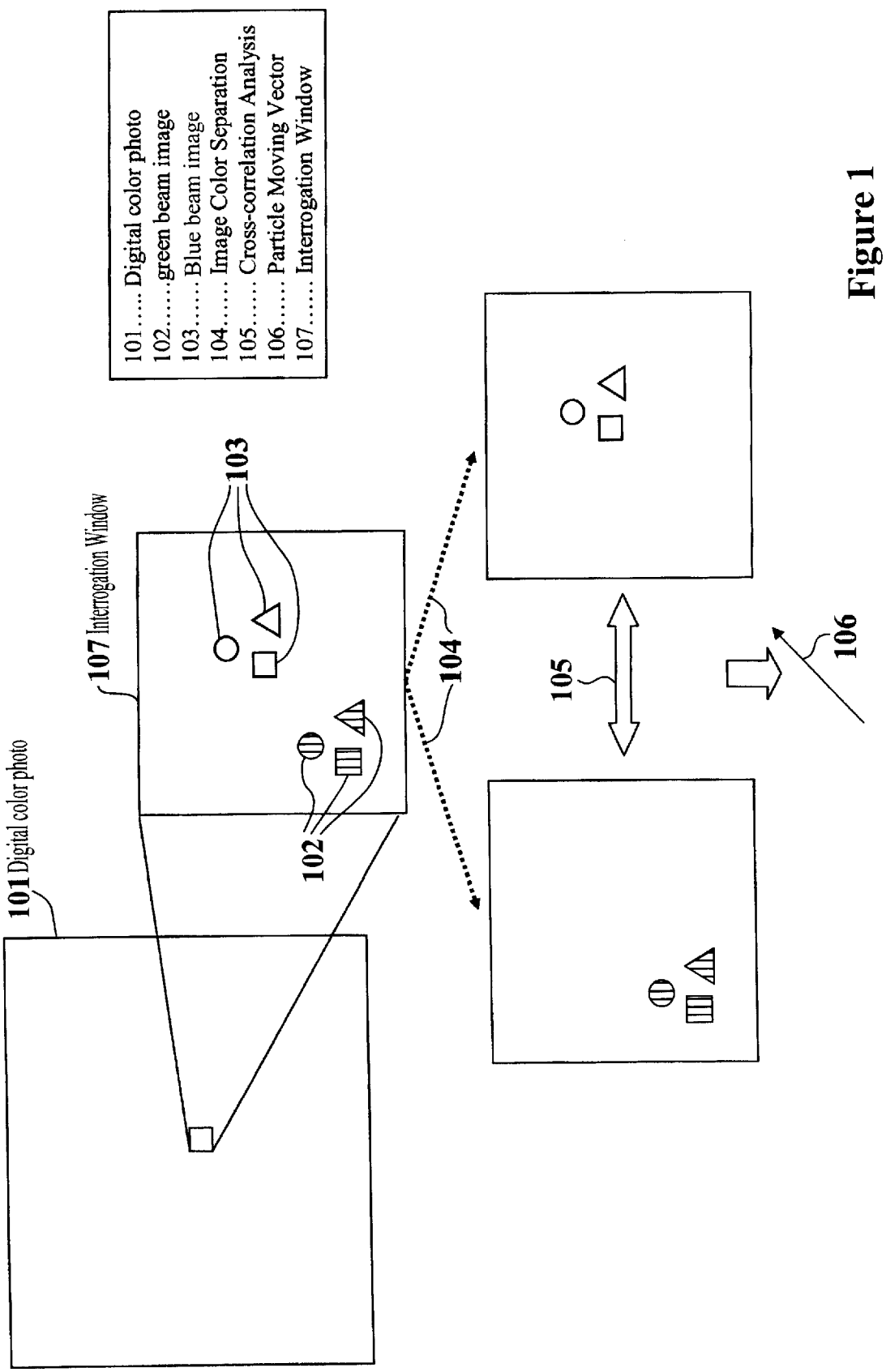
FIG. 1 is used to pictorially describe the cross-correlation analysis method used in the present invention.

Reference Number Of The Attached Drawings:

1 . . . Argon ion laser
2 . . . Combined Output of Multi-wave & Multi-color Combined Beams
3 . . . color alternating laser sheet producer
4 . . . intermittent triggering pulses
5 . . . Laser sheets of alternating blue and green color
6 . . . CCD (Charge Couple Device) Trigger
7 . . . Signal Cable
8 . . . CCD (Charge Couple Device)
9 . . . Computer
25 . . . Color Alternating laser sheet
31 . . . Beam Splitter
51 . . . Particle-seeded Flow Field
81 . . . Lead
101 . . . Digital color photo
102 . . . green beam image
103 . . . Blue beam Image
104 . . . Image Color Separation
105 . . . Cross-correlation Analysis
106 . . . Particle Moving Vector
107 . . . Interrogation Window
301 . . . Color Separator
302 . . . Green Beam
303 . . . Blue Beam
304 . . . Plane Reflector 305 . . . Intermittent Beam Chopper
306 . . . Green Intermittent Beam Pulse
307 . . . Blue Intermittent Beam Pulse
309 . . . Beam Combinator
310 . . . Laser-Sheet Generator
311 . . . Photomultiplier Tube
312 . . . Signal Generation Controller
3051 . . . Variable Motor
3052 . . . Multi-opening Beam Chopper Plate
3053 . . . Set 1 openings
3054 . . . Set 2 openings
3055 . . . Set 3 openings
501 . . . Green light output pulse
502 . . . Blue light output pulse
503 . . . Time gap between green and blue pulses
504 . . . Green image of a particle
505 . . . Blue image of a particle

DETAILED DESCRIPTION OF THE INVENTION

The equipment used in the present invention, includes a set of Color Separators (301) for separating a single beam of two colors into two separate beams, each separate beam being monochromatic and having a color different from the other. The equipment also includes an Intermittent Beam Chopper (305) for producing two pulsating beams from the two steady monochromatic beams, the two beams pulsating in an alternating manner. The equipment further includes a Beam Combinator (309) disposed in front of a Laser Sheet generator (310) to merge the two alternately pulsating beams of different color into a single sheet beam of alternating colors (5). After being processed by a computer 9 for color separation with the help of cross-correlation analysis method (105), images taken by the CCD (Charge Couple Device) of a particle flow field (51) scanned by such plane beams (5) can be used to determine a particle's velocity and direction for a 2-D measurement. All the equipment necessary for the velocity measurement for A Low-Cost Continuous-Wave-Laser (CW Laser) Digital Particle Image Velocimetry are primarily inexpensive optical components and parts especially improved for use in flow fields (like Argon ion laser (1), optical prisms, etc.). Such equipment is both inexpensive and produces competitive results.

The DPIV (Digital Particle Image Velocimetry) equipment includes:
—an Argon ion laser (1);
—a color alternating laser sheet producer (3);
—a beam Splitter (31);
—CCD (Charge Couple Device, 8);
—computer;
—Intermittent Beam Chopper (305); and
—a laser-sheet generator (310).

The feature of such equipment is its unique configuration: a pair of plane reflector plates (304a) installed behind the color separator (301) to adjust beams (302a & 303a) going into the Intermittent Beam Chopper (305); a pair of plane reflector plates (304b & 304c) installed behind the Intermittent Beam Chopper (305) at different distances to lead beams (306b & 307b) into the Beam Combinator (309); and, at last, a laser sheet generator (310) is installed behind the Beam Combinator (309) to generate a laser sheet of alternating blue-green colors (5). In addition, a CCD (Charge Couple Device) Trigger (6) is mounted after and aligned to the axis of the beam splitter (31) to generate a trigger signal to activate a shutter in the CCD camera (8).

The Intermittent Beam Chopper (305) includes a Variable Motor (3051), and a Multi-opening Beam Chopper Plate (3052) that has two circumferences designed, an inner and an outer ring of perforations. On each ring, there are three sets of openings drilled as required, with the same number but different specifications.

The equipment uses an Argon ion laser (1) in the A Low-Cost Continuous-Wave-Laser (CW Laser) Digital Particle Image Velocimetry of the present invention, and along the laser axis of each beam is a color alternating laser-sheet producer (3). A beam splitter (31) is disposed only in the axis of the green beam (306a) and not in the axis of the blue beam (307a). Beam splitter (31) splits off part of intermittent green beam pulses (306a). This split off beam (4) is used for triggering the shutter in the CCD camera (8). A CCD (Charge Couple Device) Trigger (6) converts split off optical beam (4) into electrical signals that are then sent along cable (7) to the CCD camera (8) to trigger the shutter to take pictures of the illuminated particle flow field at specific times.

Figure 3:
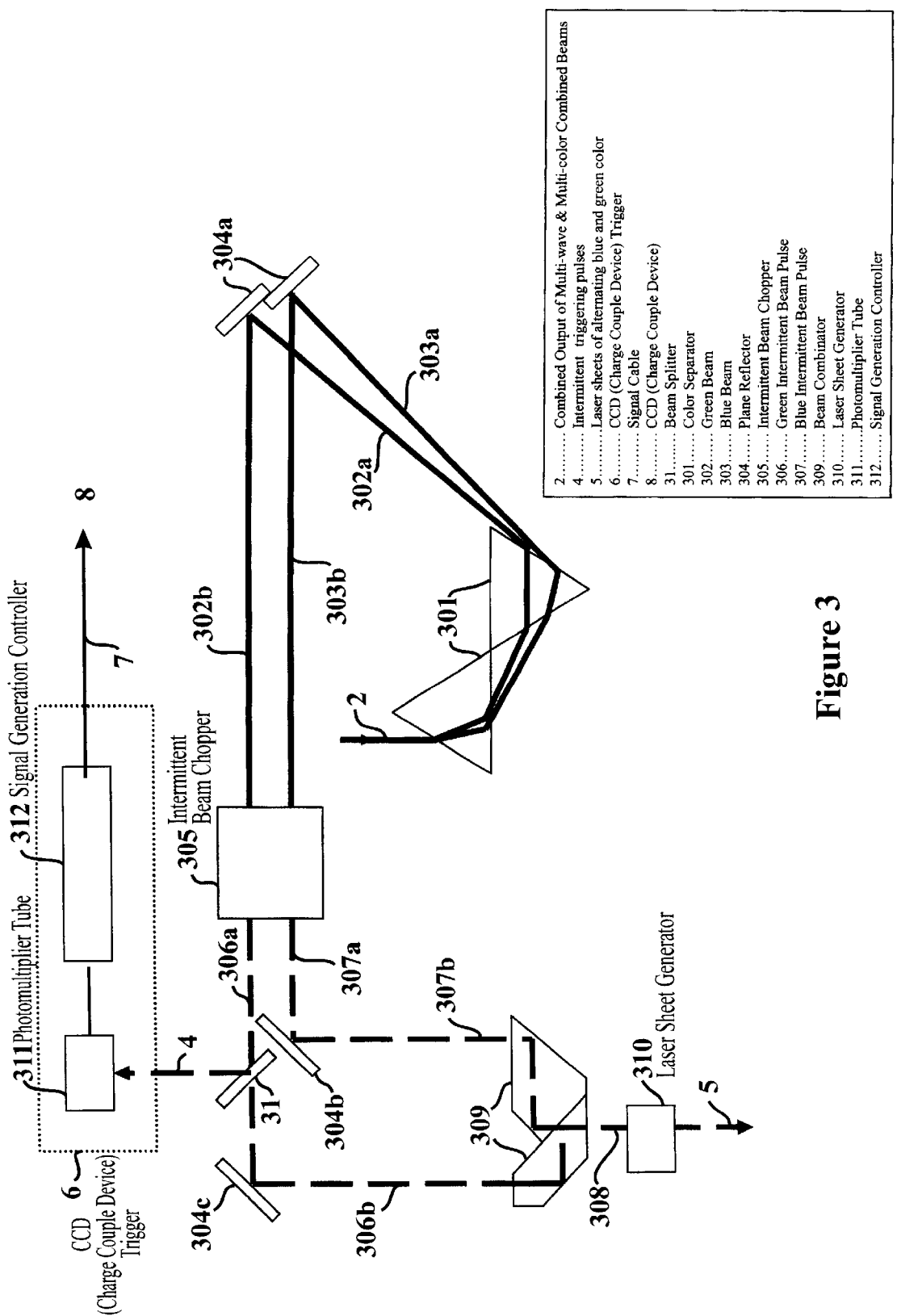
FIG. 3 illustrates, in detail, the color alternating laser sheet producer of FIG. 2 according to the principles of the present invention.

The components that make up the color alternating laser sheet producer (3) are illustrated in FIG. 3. These components include two plane reflector (304) reflectors (304a) disposed behind the color separator (301). Reflectors (304a) reflect and adjust the two monochromatic beams (302b & 303b) that impinge on the Intermittent Beam Chopper (305). A pair of plane reflectors (304b & 304c) are disposed behind the Intermittent Beam Chopper (305) at different locations to lead pulsating monochromatic beams (306b & 307b) to the Beam Combinator (309). A Laser Sheet Generator (310) made of a common Cylindrical Lens disposed behind the Beam Combinator (309).

The Continuous Laser DPIV (Digital Particle Image Velocimetry) has a Beam Splitter (31) which is disposed between the Intermittent Beam Chopper (305) and the Plane reflectors (304b & 304c), and the CCD (Charge Couple Device) Trigger (6) is disposed on one side of Beam Splitter (31) to receive split off pulsating green beam (4). The CCD (Charge Couple Device) Trigger (6), which is connected to the CCD (Charge Couple Device,8) via a Signal Cable (7), includes a Photomultiplier Tube (311), a Photomultiplier Tube Power Supply and a Signal Producer Controller (312).

Figure 4:
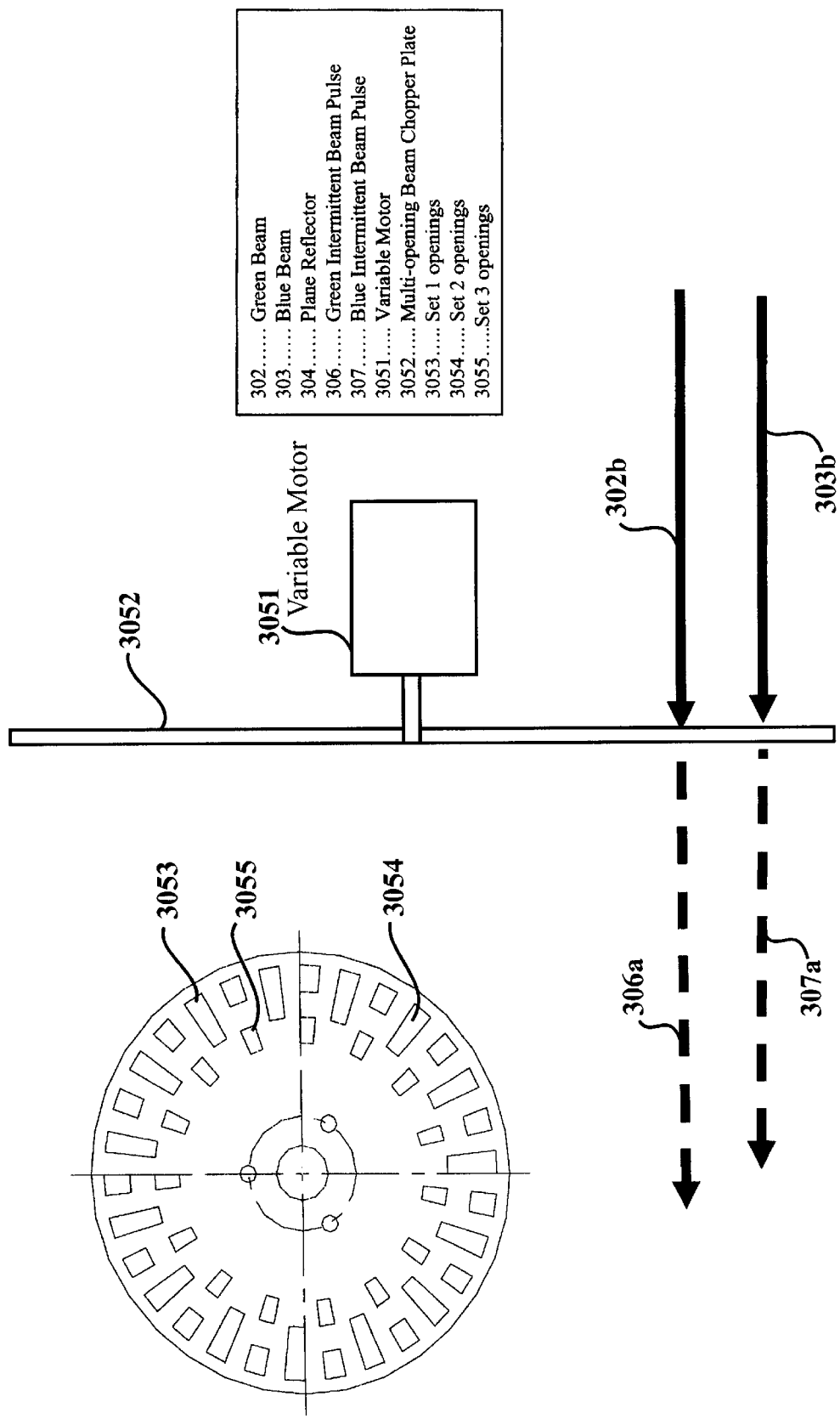
FIG. 4 illustrates, in detail, the Intermittent Beam Chopper of FIG. 3 according to the principles of the present invention.

The above-said Intermittent Beam Chopper (305) is illustrated in detail in FIG. 4. Beam Chopper (305) includes a Variable Motor (3051) and a Multi-opening Beam Chopper Plate (3052). The Plate has openings disposed at a first radius from the center of the beam chopper (305) and openings disposed at a second radius from the center. There are three sets of openings drilled as required, with the same number but different specifications. Among the three sets of openings, said Set 1 openings (3053), Set 2 openings (3054), Set 3 openings, (3055) the Set 1 openings (3053) and Set 3 openings (3055) are radial, the Set 1 openings (3053) and Set 2 openings (3054) are both at the second and larger radius, and Set 2 openings (3054) and Set 3 openings (3055) are radial and arrayed alternatively.

Figure 2:
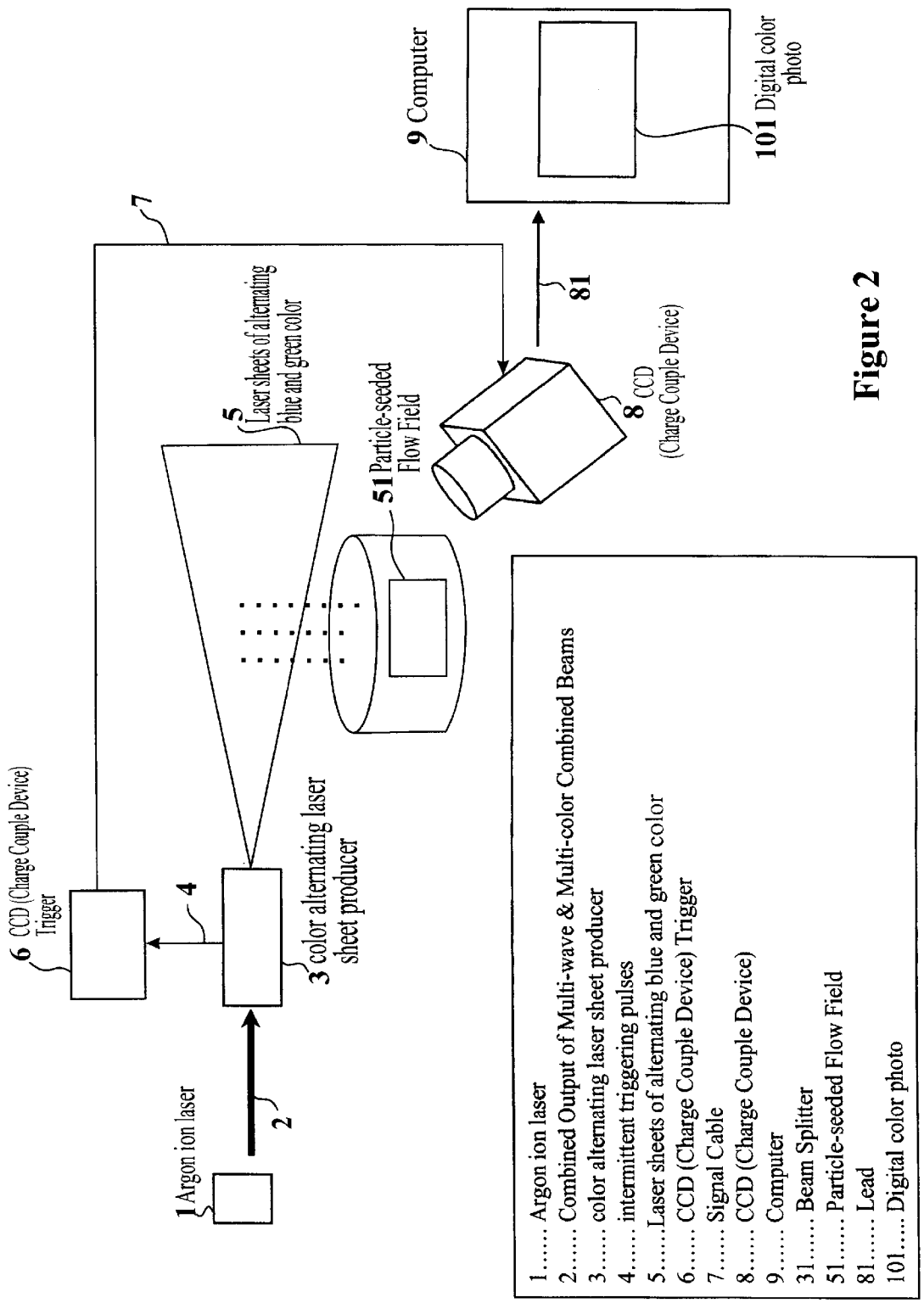
FIG. 2 illustrates the Low-Cost Continuous Wave Digital Laser Particle Velocity Meter according to the principles of the present invention.

Now, the method of determining particle velocity applied in Low-Cost Continuous-Wave-Laser (CW Laser) Digital Particle Image Velocimetry, will be discussed in conjunction with FIGS. 2, 3, and 4 in sequence. The Low-Cost Continuous Laser DPIV (Digital Particle Image Velocimetry) Multi-wavelength and Multi-color combined beam (2), in which the blue (488 nm) and green beams (514.5 nm) are most intensive, are output from the Argon ion laser (1).

As beam (2) enters the color alternating laser sheet producer (3), and therefore goes through all the devices illustrated in FIG. 3, a laser sheet of alternating blue and green colors (5) results that illuminates particle flow field (51). Beam Splitter (31), of laser sheet producer (3), splits off beam (4) which is a portion of pulsating green beam (306a). Beam pulses (4) enters trigger (6) through the Photomultiplier Tube (311) and the Signal generation Controller (312), to produce electrical trigger signals from beam (4).

As the Trigger receives the green beam signal (4), an electronic signal of a 5 volt square wave is output from trigger (6) via cable (7) to trigger shutter in CCD camera (8) causing CCD camera (8) to take images and record data of the streamlines' geometrical distributions, such as the shape of the flow field, the velocity and turbulence, etc. in a particle flow field (51). And the digital color images taken will be sent right away via a lead (81) to a computer (9) being programmed and configured to process the images and analyze the images. Through the process illustrated in FIG. 1, a color separation treatment and cross-correlation analysis of the CCD (Charge Couple Device, 8) images will be performed to determine the velocity and direction of a particle, its moving locus, the 2-D velocity and the spatial distribution of velocity in the flow field.

FIG. 3 illustrates the process and the apparatus for converting beam (2) into laser sheet (5) and into the trigger electrical signal sent over cable (7). While Combined Output of Multi-wavelength Multi-color beams (2), output from a laser (1), are converted by color alternating laser sheet producer (3), beam (2) will first enter the Color Separator (301) consisting of dual equilateral triangular column prisms causing combined beam (2) to separate into a monochromatic green beam (302a) and a monochromatic blue beam (303a). Color separator (301) functions the same way as the sunlight is separated into red, orange, yellow, green, blue, indigo, and violet while going through a prism. To reduce the space consumed by laser sheet producer (3) while allowing for beam trips when configuring the optical equipment, plane reflectors (304a–c) are needed to adjust the beams in order to take the most advantages of the limited space. These reflectors (304a–c), in addition, have to adjust the beam pairs (302b, 303b and 306a, 307a and 306b, 307b) so that they are parallel to each, especially when beam pair (302b, 303b) enters the Intermittent Beam Chopper (305). Intermittent beam chopper (305) is illustrated in detail in FIG. 4. As the blue (303b) and green (302a) continuous laser beams in parallel enter Chopper (305), pulsating green beam (306a) and pulsating blue beam (307a) emerges. Beams (306a) and (307a) pulsate in an alternating manner, so that at any one time, only one of the green beam (306a) and the blue beam (307a) is on. Pulsating beam (306a) impinges on reflector (304c) to become beam (306b). Pulsating beam (307a) impinges on reflector (304b) to become beam (307b). Pulsating beams (306b) and (307b) impinge on Beam Combinator (309), forming a single color-alternating beam (308). The Beam Combinator (309), having two pentagonal prisms, can make the two intermittent beam pulses (306b & 307b) combine into a single color-alternating beam (308) since beams (306b & 307b) may refract or reflect in the prisms. Taking advantages of this feature, we can make the two parallel intermittent pulsed beams (306b & 307b) parallel to each other prior to the formation of beam (308).

The shutter in CCD camera (8) is actuated by TTL (standard 5 V square waves) electrical signals. Such electrical trigger signals are produced when the CCD Trigger (6) receives the split off green intermittent pulsed beam (4). To achieve the above, a Beam Splitter (31) is installed in the course of the intermittent green pulsed beam (306a), and part of intermittent green pulsed beam (306a) is split off and reflected by beam splitter (31) to form optical trigger pulsed beam (4). As the intermittent green light pulses (4) emerge from the Beam Splitter (31), beam (4) will be led into the CCD (Charge Couple Device) Trigger (6), which consists mainly of a Photomultiplier Tube (311), a Photomultiplier Tube Power Supply and a Signal Generation Controller (312). Trigger 6 essentially converts optical pulsed beam (4) into an electrical signal in the form of a 5 volt square wave that is output from trigger (6) via cable (7) to CCD camera (8).

As shown in FIG. 4, when the Multi-opening Chopper Plate (3052) of the Intermittent Beam Chopper (305) is being driven (or rotated) by a variable-speed motor (3051), openings of Set 2 (3054) and Set 3 (3055) will convert steady green beam (302b) into a pulsating beam (306a) and convert steady blue beam (303b) into a pulsating blue beam (307a), respectively. Green pulsating beam (306a) will pulsate on when pulsating blue beam (307a) pulsates off and vice versa. Thus, pulsating beams (306a) and (307a) pulsate in an alternate manner in terms of time. Set 1 openings (3153) and reference to Set 2 openings (3154) are used to monitor the rotation speed of the variable speed motor (3051). After producing the pulsating beams (306 and 307), a Beam Combinator (309) is installed to combine the two alternating intermittent beam pulses into a single color-alternating beam (308); and then this color-alternating beam (308) will transform into a color-alternating laser sheet (5) by a Laser Sheet Generator (310). The frequency of the alternating beam pulses in sheet (310) can be adjusted by adjusting the speed of Motor (3051).

Figure 5:
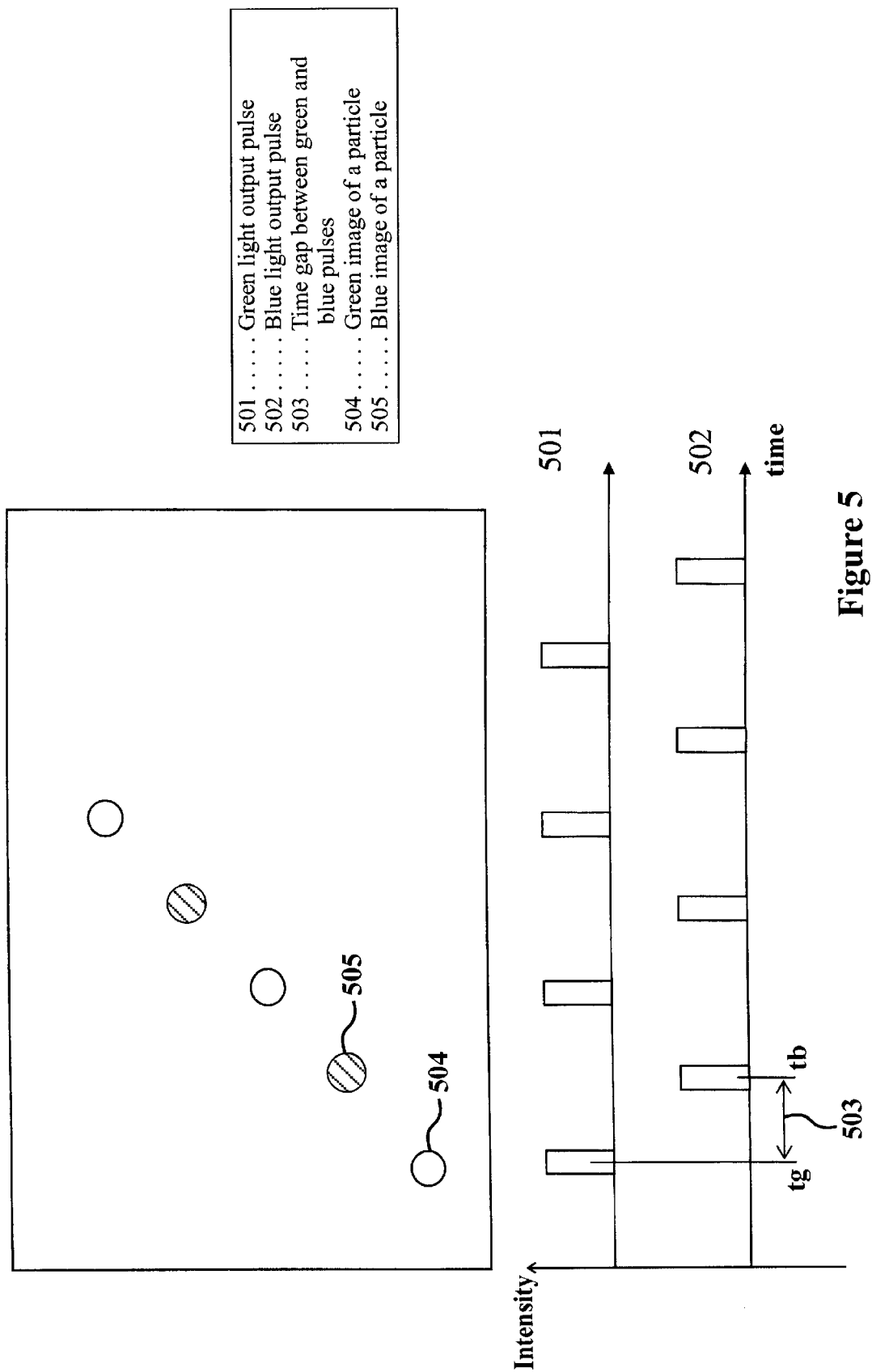
FIG. 5 illustrates Schematic pulse train and delay time between two pulses of particles illuminated by the color alternating laser sheet according to the principles of the present invention.

The pulse trains in time sequence of the green (501) and blue (502) beams, and the time delay of the blue beam pulse relative to the green pulse (or the time gap) (503) are shown in FIG. 5. The time gap (503) is the amount of time elapsed from the center of a green pulse (501) at time $t_g$ to the time of the center of the blue pulse (501) at time $t_b$. The time gap (503) or ($t_b$–$t_g$) can be adjusted by adjusting the speed of the variable-speed motor (3051) which, in turn, adjusts the rotation speed of chopper plate (3052). Images of a moving particle illuminated by green and blue light pulses are also shown schematically in FIG. 5. Through the cross-correlation analysis in the computer (9), the displacement of particles recorded in a photo (101) can be evaluated statistically. Furthermore, the velocity vector (106) of the moving particle in terms of the displacement divided by the time gap between blue and green pulses can be obtained.

Comparing FIGS. 4 and 5, opening (3054) produces pulse (502) in blue beam (307a) and opening (3055) produces pulse (501) in green beam (306a). Openings (3053) and (3054) are used to monitor the rotation speed of the chopper plate (3052). It is to be understood that feedback supplied by light going through openings (3053) and (3054) is fed back to the variable motor (3051) to make sure that motor (3051) is operating at the proper programmed speed.

In order to identify the movement of a large amount of particles, a statistical method called "cross-correlation" or "cross-correlation analysis" is applied. This method is well known by most engineers and can be coded easily with FORTRAN, C, or the other commercial computer languages. By overlapping the pair of green-and-blue images, the cross-correlation method uses statistic principles to find the most probable correlated pairs of particles and their locations in the overlapped image, and displacement is calculated from the relative locations of the particle pair by converting with the relative imaging scale. The velocity can further be obtained by dividing the displacement with the relative time interval between images (i.e. the time gap). A computer (9) is necessary for image storage and calculation of complicated cross-correlation analysis. The basic procedures of velocity determination by computer (9) using cross-correlation analysis is listed as follows:

A color image is first stored in the computer;

The color image including green and blue speckles of particles is separated into green and blue images respectively;

Dividing full images into sub-regions called an interrogation window;

Perform a cross-correlation between each pair of green and blue sub-regions;

Search for the maximum pixel in the cross-correlation;

Fit a small sub-region around the peak to determine the center of the location which contains the peak;

Output the value as the particle displacement; and

Convert the displacement with the relative imaging scale and then divide by the relative time interval between images to obtain velocity.

As the present invention "Method & Equipment of the Low-Cost Continuous Laser Digital Particle Image Velocity Measurement" uses a Photomultiplier Tube (311) to sense a single color beam (4) to actuate the CCD (Charge Couple Device) (8), the alternating times (i.e. the pulse frequency) and order of the blue and green pulses can be inferred. In such a way, the quality of images taken is assured.

Practical Operation Procedure

1. Produce a combined beam (2) of blue and green light from an Argon ion laser (1).

2. Separate the combined beam (2) into a single blue beam (303) and a single green beam (302) by using coupled equilateral hexagonal prisms (301) as a Color Separator.

3. Mount a pair of reflectors (304a) at a proper position to reflect the blue (303) and green (302) beams, so that the reflected green beam (302b) is disposed above and is parallel to the reflected blue beam (303b).

4. As the two beams impinge on the rotating "Multi-openings Beam Chopper Plate (3052)," the green beam passes through the inner Set 3 openings (3055) and the blue beam passes through the outer Set 2 openings (3054), pulses of alternating and intermittent blue (307a) and green (306a) beams are generated since the beams can only go past the openings and will be stopped by the plate between the openings.

5. Mount a pair of reflectors (304b and 304c) at proper positions to reflect the two pulsed beams (306a and 306b) to produce reflected pulsating beams (306b) and (307b) which are also parallel to each other.

6. Equip a Beam Splitter (31) in the course of the pulsed green beam (306a), the beam splitter (31) being between the Multi-opening Beam Chopper Plate (3052) and the reflector (304c) beam splitter (31) serving to split off the green beam (4) from beam (306a) and send beam (4) into a Photomultiplier Tube (311).

7. Combine the two parallel pulsed beams (306b and 307b) into a single color-alternating beam (308) using a Beam Combinator (309).

8. Use a Cylindrical Lens as a Laser Sheet Generator (310) to spread the color-alternating beam (308) into a color-alternating laser sheet (5), which will be used to illuminate to the particle flow field (51) for measurements.

9. As the Photomultiplier Tube (311) catches the split off green triggering optical pulses (4), and converts the green optical pulses (4) into a TTL electrical signal in the form of a 5 volt square wave via the signal generation controller (312). The TTL electrical signal is sent, via cable (7) to the CCD camera (8) to trigger the shutter in the CCD camera (8) to take images of the illuminated particle flow field 51.

10. Process the images on a Computer (9), and with the help of cross-correlation analysis method to determine particles' directions and speeds in the flow field.

From the above practical operation, we understand that the "Low-Cost Continuous Laser DPIV (Digital Particle Image Velocimetry)" only needs basic equipment often used in flow field measurement, in addition to color alternating laser sheet producer (3). With such simple equipment Low-Cost and easily operating, many complicated 2-D flow-field velocity measurement can be easily and inexpensively performed.

What is claimed is:

1. An apparatus for velocity measurement of particles in a particle-seeded particle flow field, said apparatus comprising:

a continuous Argon ion laser emitting both continuous wave blue and continuous wave green beams of light;

a color alternating laser sheet producer receiving said continuous wave blue and continuous wave green beams of light from said argon laser and outputting only a single laser sheet that is comprised of alternating pulses of blue and green light, said particle-seeded flow field being illuminated by only said single laser sheet of alternating pulses of blue and green light;

a photomultiplier with beam splitter receiving a green pulsed beam used in the production of said laser sheet;

a CCD (charge coupled device) receiving and recording images, said single laser sheet illuminating said particle-seeded flow field, said single laser-sheet being output from said color alternating laser-sheet producer; and a computer programmed and configured to calculate, via cross-correlation analysis, the velocity of particles in the particle flow field from the recorded images of said particle flow field illuminated by said single laser sheet, said color alternating laser sheet producer comprising:

an intermittent beam chopper converting said blue and said green continuous wave beams of light from said argon laser into beams of alternating blue and green pulses;

a beam combinator receiving said beams of alternating blue and green pulses and combining them into a single beam; and a color alternating laser sheet generator receiving said single beam and converting said single beam into said single laser-sheet, said intermittent beam chopper comprising a variable-speed motor and a perforated multi-opening beam chopper plate that has an inner and an outer circumference, each circumference having three sets of perforations, said perforated multi-opening beam chopper plate producing said beams of alternating blue and green pulses from said blue and green continuous wave beams of light when said blue and green continuous wave beams of light illuminate said perforated chopper plate when said perforated chopper plate rotates.

2. The apparatus of claim 1, further comprising a CCD trigger disposed between said beam splitter and said CCD, said CCD trigger converting said green pulsed beam received from said beam splitter and converting said green pulsed beam into electrical signals that dictate when said CCD receives and records said images of the particle-seeded flow field illuminated by said single laser sheet.

3. The apparatus of claim 1, said color alternating laser sheet producer further comprising a first plane reflector reflecting said blue and said green continuous wave beams into said intermittent beam chopper and a second plane reflector reflecting said beams of alternating blue and green pulses into said beam combinator.

4. The apparatus of claim 1, said three sets of perforations in said multi-opening beam chopper plate comprising, Set 1 openings and Set 3 openings being radial, Set 1 openings and Set 2 openings being both at the outer circumference, and Set 2 openings and Set 3 openings being radial and arrayed alternately.

5. A digital particle image velocimeter, comprising:
   a continuous wave laser emitting light of a first wavelength and a second wavelength;
   a light manipulation device receiving said light emitted from said laser and producing only a single beam alternating between said first and said second wavelengths, said single beam only illuminating a particle-seeded flow field;
   a CCD camera taking images of a particle-seeded flow field illuminated by only said single beam alternating between said first and said second wavelengths to determine two-dimensional velocities of particles within said particle-seeded flow field; and
   a triggering device triggering said CCD camera to take images at specific time intervals, said light manipulation device comprising a rotating chopper wheel having openings, wherein continuous wave beams of said first and said second wavelengths impinge on said rotating chopper wheel converting said continuous wave beams of said first and second wavelengths into two pulsating beams, one of said first and another of said second wavelength, said pulsating beams being pulses of said first and said second wavelengths, said pulses alternating in time so that at any one time, only one of said two pulsating beams is on.

6. The velocimeter of claim 5, further comprising a computer that processes images captured by said CCD and calculates a two-dimensional velocity of an illuminated particle in said particle-seeded flow field.

7. The velocimeter of claim 5, said light manipulation device further comprising a beam combinator to combine said two pulsating beams output from said rotating chopper wheel into one beam prior to illumination of said particle-seeded flow field.

8. The velocimeter of claim 7, said light manipulation device further comprising a laser sheet generator receiving said beam output from said beam combinator and producing a laser sheet to illuminate said particle-seeded flow field.

9. The velocimeter of claim 5, said light manipulation device further comprising a color separator to receive light from said laser and producing a first beam of said first wavelength and a second beam of said second wavelength prior to illumination of said rotating chopper wheel.

10. The velocimeter of claim 5, wherein one of said pulsating beams output from said rotating chopper wheel is also used to trigger said CCD camera as to when to take pictures of the illuminated particle-seeded flow field.

11. A method for determining particle velocity in a particle-seeded flow field, said method comprising the steps of:
   emitting continuous light of two wavelengths from a light source;
   splitting said light into two continuous monochromatic beams, one beam for each wavelength;
   passing said two beams through a chopper to produce two pulsating monochromatic beams of pulses, the pulses of each beam alternating with the other beam so that at any time, no more than one of said two beams is pulsed on;
   combining said two monochromatic pulsed beams into only a single beam alternating between said two wavelengths;
   illuminating said particle-seeded field with only said single beam alternating between said two wavelengths;
   capturing and recording images via a CCD device of said particle field illuminated by only said beam alternating between said two wavelengths; and
   determining a velocity for particles in said flow field from said recorded images.

12. The method of claim 11, one of said two pulsating monochromatic beams exiting said chopper is used to trigger said CCD device to capture said images.

13. The method of claim 11, said two continuous and monochromatic beams entering said chopper being spatially separated, said chopper being a rotating wheel with slits positioned to produce said two pulsating monochromatic beams from said two entering beams, wherein no more than one of said two pulsating beams is on at any moment of time.

14. The method of claim 11, said single beam of two alternating wavelengths passing through a laser sheet generator to produce a laser sheet immediately prior to illumination of said particle-seeded flow field.

15. An apparatus for measuring velocity of particles in a particle-seeded flow field, said apparatus comprising:
   a continuous light source emitting light of two different wavelengths;
   a color separator receiving said continuous light from said light source and splitting the light into two separate continuous monochromatic beams according to frequency;
   a rotating wheel having a plurality of slits positioned to receive said two continuous and monochromatic beams and to convert said two beams into two pulsating monochromatic beams, each beam pulsating on when the other of said two pulsating monochromatic beams is pulsed off;
   a beam combinator receiving said two alternately pulsating monochromatic beams from said wheel and merging said two pulsating monochromatic beams into only a single combined beam comprising light pulses of said two different wavelengths, said single resulting beam having no more than one of said two wavelengths pulsed on at any point in time, only said combined beam of two pulsating wavelengths illuminating said particle-seeded flow field;
   a CCD device capturing and recording images of said combined pulsating beam illuminating said particle flow field; and
   a computer attached to said CCD device, said computer programmed and configured to calculate particle velocities for particles in said particle flow field from said captured and recorded images.

16. The apparatus of claim 15, further comprising a CCD device trigger, said trigger receiving one of said two pulsating monochromatic beams emerging from said wheel to trigger said CCD device.

17. The apparatus of claim 15, further comprising a laser sheet generator to generate a combined planar laser sheet of two wavelengths prior to illumination of said particle-seeded flow field.

* * * * *